United States Patent [19]

Tsuruta

[11] Patent Number: 4,555,747
[45] Date of Patent: Nov. 26, 1985

[54] COUPLING MECHANISM OF PHOTOGRAPHIC FLASH DEVICE

[75] Inventor: Yuzo Tsuruta, Kanagawa, Japan

[73] Assignee: Kabushiki Kaisha Sunpak, Tokyo, Japan

[21] Appl. No.: 302,257

[22] Filed: Sep. 14, 1981

[51] Int. Cl.[4] .................. G03B 7/099; G03B 15/05
[52] U.S. Cl. ............................ 362/3; 354/145.1; 339/75 R
[58] Field of Search .............. 362/3, 8, 9, 11, 12, 362/13; 354/145.1; 339/75 R, 75 P, 75 M

[56] References Cited

U.S. PATENT DOCUMENTS

| 3,134,547 | 5/1964 | Kapteyn et al. | 354/145.1 |
| 3,735,680 | 5/1973 | Buckler et al. | 362/8 |
| 3,852,790 | 12/1974 | Robinson | 354/145.1 |
| 4,025,933 | 5/1977 | Berg | 362/3 |
| 4,382,666 | 5/1983 | Ohtaki et al. | 354/145.1 |
| 4,449,802 | 5/1984 | Nakamura | 354/145.1 |

Primary Examiner—Craig R. Feinberg
Assistant Examiner—David A. Okonsky
Attorney, Agent, or Firm—Neuman, Williams, Anderson & Olson

[57] ABSTRACT

A photoflash apparatus is disclosed in which a flash unit is selectively connected to adapter units through a coupling mechanism which includes a coupling pin in a mounting structure of one unit engaged by a slide plate in a mounting structure of the other unit. The mounting structures are resiliently stressed and interengaged in a manner such as to obtain a highly reliable and tight connection. The coupling mechanism is operable by a door of a battery compartment, or alternatively through outside actuating members, and the mechanism may be locked and unlocked as desired.

14 Claims, 13 Drawing Figures

COUPLING MECHANISM OF PHOTOGRAPHIC FLASH DEVICE

This invention relates to photoflash apparatus and more particularly to photoflash apparatus in which a flash unit may be selectively connected through various different types of adapter units to different types of cameras for operation therewith. With the invention, a coupling mechanism is provided through which the flash and adapter units are securely and reliably connected together while being separable whenever desired for repair or replacement purposes or to permit use of the flash unit with different types of cameras. The coupling arrangement is comparatively simple in construction and operation, is highly reliable and is readily and economically manufacturable.

BACKGROUND OF THE INVENTION

Recent important developments have made it possible to combine a main flash unit with various types of cameras through the selective use of adapters in a manner such that a camera owner may obtain the main flash unit and operate it with the particular type of camera which he owns. At the same time, if he should have another type of camera or if he should obtain a new camera, he does not need to replace the main flash unit but may obtain only the particular adapter which is required.

SUMMARY OF THE INVENTION

This invention was evolved with the general object of providing a secure, reliable, readily operable and economically manufacturable arrangement for selectively securing adapter units to flash units in photoflash apparatus.

In accordance with the invention, coupling means are provided for securing an adapter unit to one end of a main body of a flash unit in the form of interengageable mounting structures, one of which includes a central projecting pin and the other including a wall having a central opening through which the pin extends with a locking member being engageable with the pin and being operable to a locked position in which the mounting structures are so stressed that the units are held tightly together with the locking member being held in its locked position.

Preferably, and in accordance with an important feature, the locking member is in the form of a slide plate having an opening through which a terminal end portion of the pin extends, the pin having a recess for receiving a portion of the slide plate adjacent the opening when the slide plate is moved to its locked position. The pin and the slide plate have surfaces which are cammingly engaged to augment stressing of the mounting structures and to resiliently hold the units together.

In accordance with a specific feature, the pin is mounted on a central portion of a resilient plate which is supported at its periphery and which is stressed to assume a dish shape when the locking member is moved to its locking position.

Another specific feature is in the provision of interengaging beveled surfaces such that the mounting structures are accurately centered and more tightly held against relative movement in any direction when the locking member is moved to its locking position.

Another feature of the invention relates to the mounting of the locking member and associated parts in an end wall portion of the flash unit adjacent a battery compartment. Preferably, the locking member is associated by movement of a door for the battery compartment to a fully closed position.

In modified arrangements, an actuating member is located on the outside of the body of one unit and is coupled to the locking member through a connecting means extending through a wall. In one arrangement, the connecting means is rigidly connected to the locking member and a nut is threaded thereon.

In another arrangement, the actuating member and the connecting member are movable in one direction to actuate the locking member in a transverse direction to lock the locking member against movement.

The arrangements of the invention result in a coupling mechanism which is highly effective and reliable. It is noted that resilient stressing of the parts is obtained in a manner such that any forces applied which might tend to move one unit relative to the other, particularly including forces suddenly applied in shocks and vibrations, are absorbed in a resiliency of the parts. The energy developed by such forces is stored and dissipated in a manner such as to avoid loosening of the connections and to avoid undue stressing and breakage of the parts.

This invention contemplates other objects, features and advantages which will become more fully apparent from the following detailed description taken in conjunction with the accompanying drawings.

DESCRIPTION OF PREFERRED EMBODIMENTS

Figure 1:
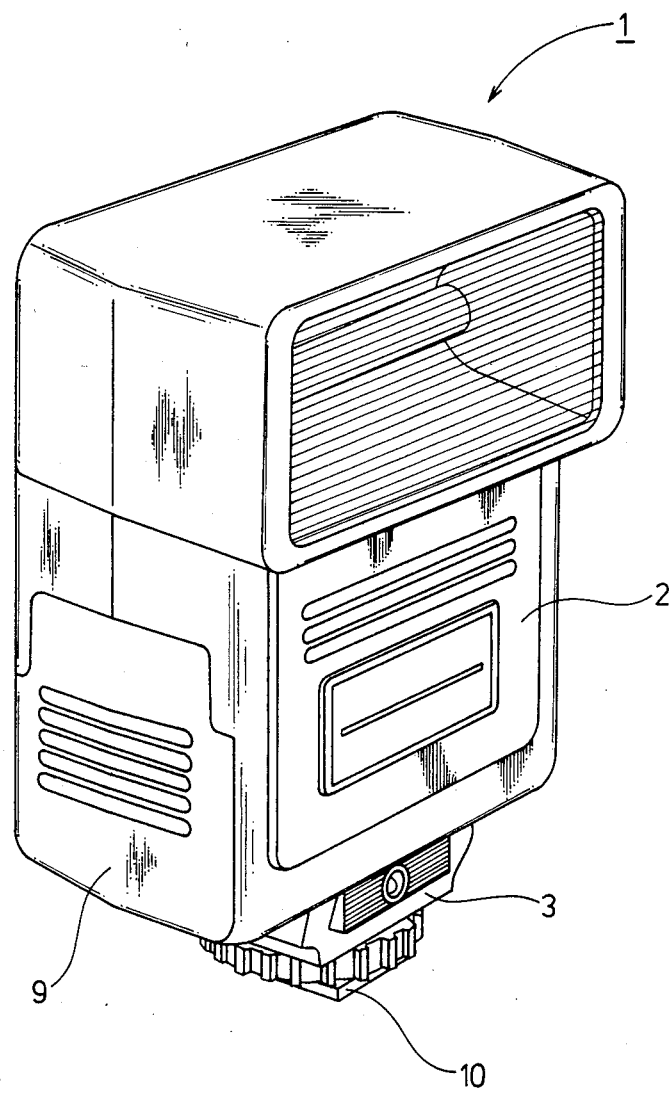
FIG. 1 is a perspective view showing a flash unit and an adapter unit connected in accordance with the invention.

Referring to FIG. 1, reference numeral 1 generally designates a flash device constructed in accordance with the invention and including a main body 2 which is arranged to be secured to a camera through an adapter 3 secured thereto, through a coupling arrangement provided in accordance with the invention.

Figure 2:
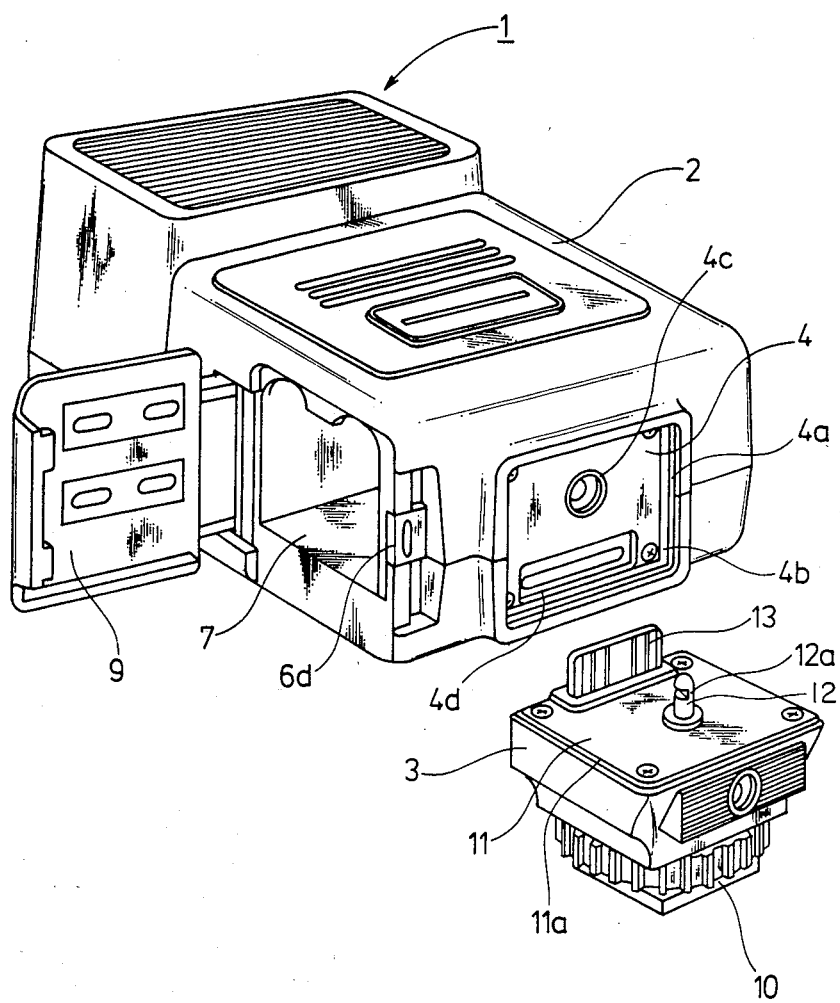
FIG. 2 is a view similar to FIG. 1, but showing the units separated and with the flash unit on its back side and with a battery door opened, to show features of construction of the units.
Figure 6:
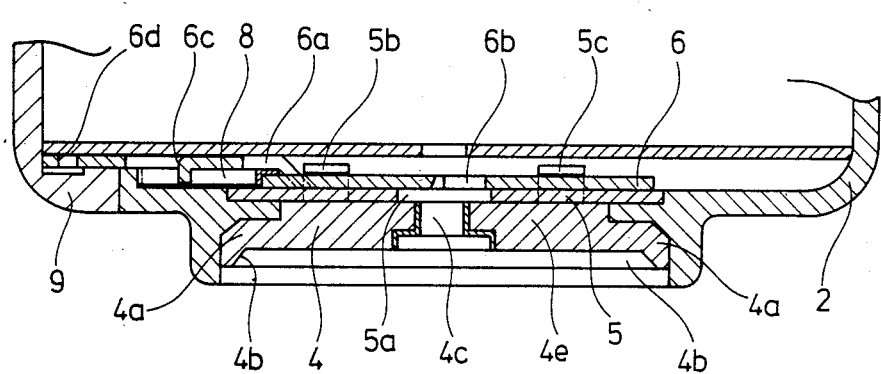
FIG. 6 is a vertical sectional view showing a bottom portion of mounting structure on the lower end of the main body of the flash unit, on an enlarged scale.

As shown in FIG. 2, a socket plate 4 is secured in a recessed portion of the body 2 and, as is also shown in FIG. 6, the socket plate 4 is formed with a peripheral shoulder 4a having an inner surface 4b of which is slanted or beveled. The socket plate 4 also includes a circular opening 4c and a slot 4d for receiving mating portions of the adapter 3, as hereinafter described.

Figure 3:
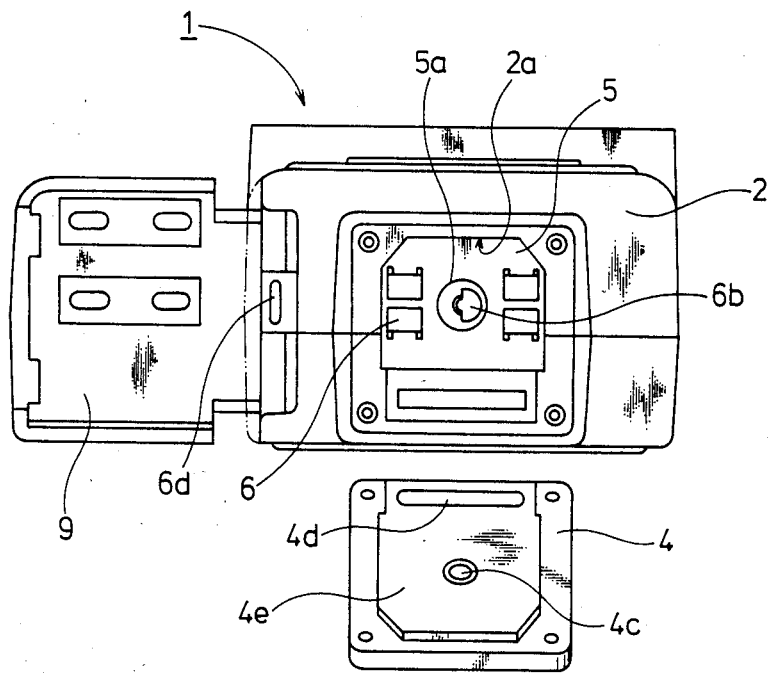
FIG. 3 is a bottom plan view of the flash unit showing it with a battery door open and also showing a mounting plate thereof separated therefrom to show how they fit together.
Figure 4:
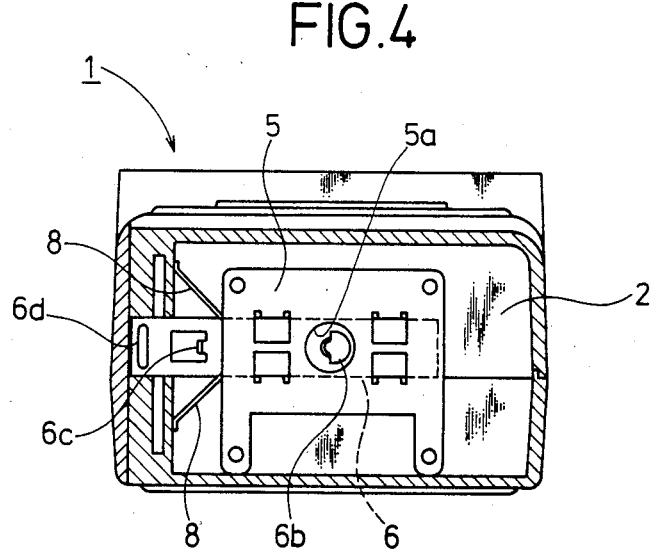
FIG. 4 is a sectional view taken through a bottom portion of the flash unit just above the mounting plate which is separated from the unit in FIG. 3.

As shown in FIG. 3, the main body 2 of the flash unit has a recess 2a which is arranged to receive a projecting portion 4e of the plate 4 of the same shape, to act as a positioning recess.

A support plate 5 is mounted behind the positioning recess 2a and is affixed to the main body 2 by screws which also secure the socket plate 4 to the end of the main body 2. The support plate 5 includes an opening 5a which registers with the opening 4c of the socket plate 4 and also includes two pairs of struck-out flange portions 5b and 5c which have inwardly-turned ends and which act as guides for a slide plate 6 operative as a lock member. The slide plate 6 is an elongated member which has an intermediate step portion 6a so that it has two portions offset from one another in spaced planes. One portion is provided with an opening 6b adapted to register with the opening 4c in the plate 4 and the opening 5a in the support plate 5. The opening 6b may preferably be generally circular except for a smaller diameter portion at one side, adapted to engage in a recess in a locking pin in a manner as hereinafter described. The plate 6 further includes a struck-out portion 6c operative as a stop device and it is formed with a slot adjacent one terminal end 6d thereof.

The structure including plates 4 and 5 and the slide plate 6 are located in a wall portion of the main body 2 which acts as an end wall of a battery compartment 7.

Figure 5:
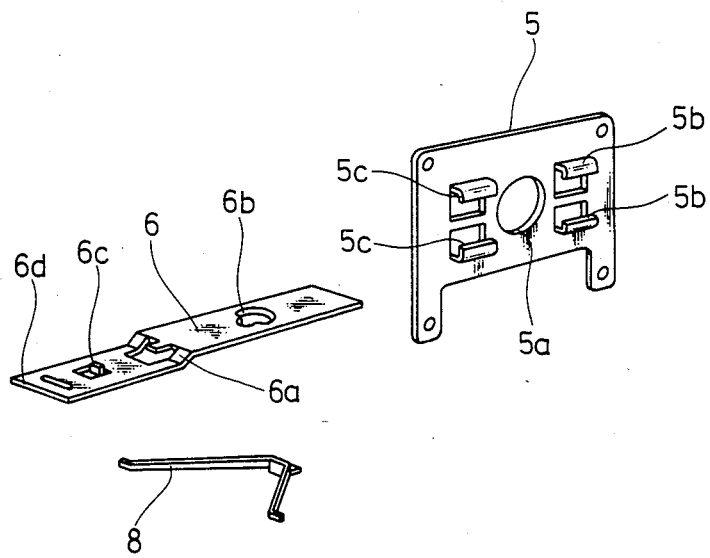
FIG. 5 is a perspective view showing a slide plate, a support plate for the side plate and a leaf spring for operating on the slide plate.

The slide plate 6 is urged toward a locked position by means of a leaf spring member 8 in the form as shown in FIG. 5, arranged to engage a portion of the plate 6 adjacent the step portion 6a thereof, the ends of the member 8 being arranged to engage suitable support surfaces of the main body 2.

The battery compartment 7 is closed by a hinged door 9. When the door 9 is moved to its closed position, a surface adjacent the free end thereof engages the terminal end 6d of the slide plate 6 and positively moves the slide plate 6 to its locked position.

The adapter 3 includes a base portion 10 having one end arranged to be secured to a camera. At its opposite end, the upper end in the arrangements as illustrated, the adapter 3 includes a resilient plate 11, the corners of which are secured thereto by suitable screws. Plate 11 has a peripheral beveled surface 11a engageable with the beveled surface 4b of socket plate 4. A coupling pin 12 projects from a central portion of the plate 11 and is arranged to extend through the registering openings 4c, 5a, and 6b of the plates 4, 5 and 6.

In addition, a connector 13 is secured to the adapter 3 at one edge of the plate 11 and is arranged to project through the slot 4d in the plate 4 for making electrical connections with contacts, not shown, within the body 2 of the flash unit 1.

The coupling pin 12 is formed with a recess adjacent the terminal end thereof which may preferably be of generally rounded or pointed shape, as shown. The surface portion which defines the end of the recess closest to the terminal end of the pin 12 is at a slight angle to a plate transverse to the axis of the pin 12 and is engaged with a surface portion of the slide plate 6 adjacent the opening 6b therein.

Figure 7:
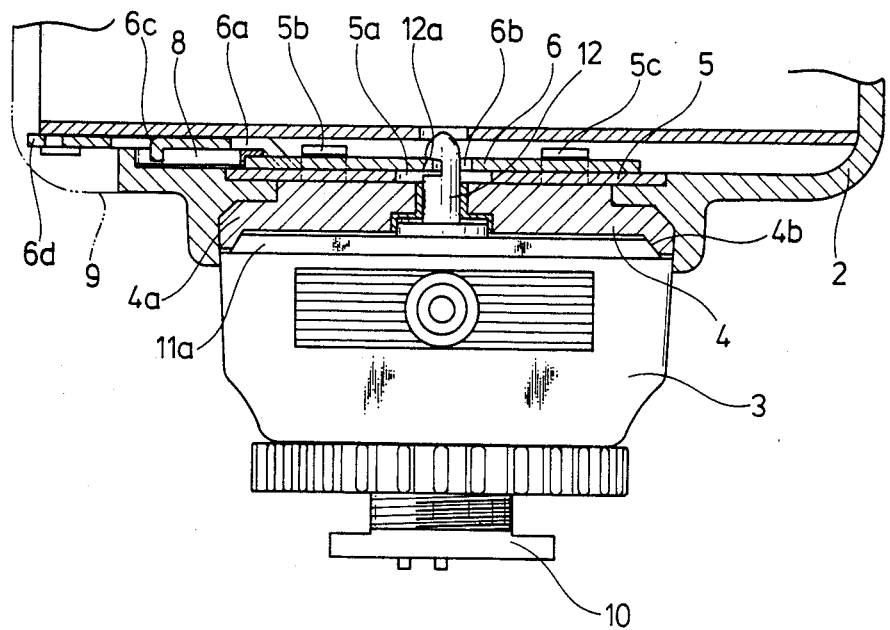
FIG. 7 is a view similar to FIG. 6, showing the connection of the adapter unit to the flash unit, the upper part of the adapter unit being shown in section, the parts being shown in an initial position before a final locking operation.
Figure 8:
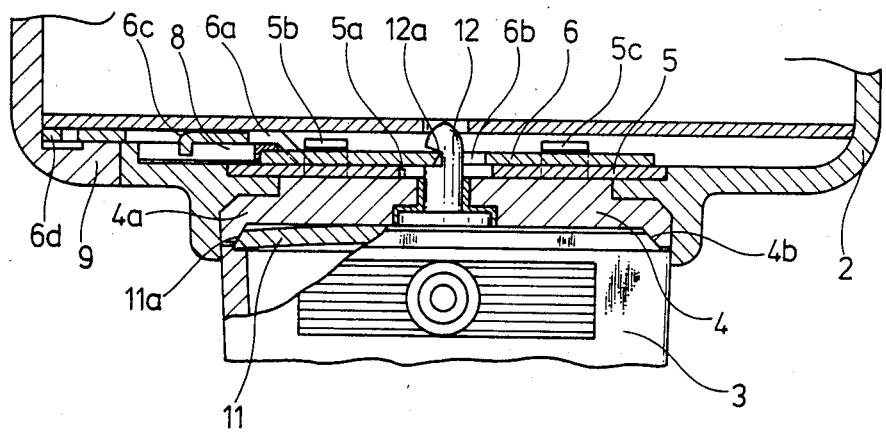
FIG. 8 is a view similar to FIG. 7, but showing the relationship of the parts after a final locking operation is performed.

The operation of the locking arrangement is illustrated in FIGS. 7 and 8. Initially, the adapter 3 and flash unit body 2 are positioned as shown in FIG. 7 with the pin 12 projecting through the opening in the plates 4–6. During movement to the position of FIG. 7, the slide plate 6 is cammed outwardly by the rounded end of pin 12, against the force of spring 8, and is then moved by spring 8 to the position as illustrated in which the upper surface of the slide plate is engaged with the uppermost part of the inclined surface of the recess 12a. Then the slide plate 6 is moved inwardly to a position as depicted in FIG. 8, in which it acts on the inclined surface of the recess 12a to cam the pin 12 upwardly and to deform and stress the plate 11. With this arrangement, the flash unit 1 and the adapter 3 are tightly held together.

Also, the slide plate 6 is held through frictional forces in a manner such as to oppose movement toward an unlocked position. However, the slide plate 6 can be moved to an unlocked position by opening the door 9 and engaging the slot adjacent the terminal end 6d thereof to pull the slide plate 6 outwardly and release the adapter. It should be understood, of course, that normally an adapter may never be removed, once installed. However, it is desirable to allow removal for replacement or repair purposes or to allow use of the flash unit 1 with various types of cameras through different types of adapters.

It is noted that in the position as illustrated in FIG. 7, the terminal end 6d of the slide plate 6 projects outwardly, such that the slide plate 6 may be positively moved inwardly to its locked position through an inward force applied from the free end of the door 9 for the battery compartment 7.

It is also noted that in initially moving the adapter and flash units together to the condition shown in FIG. 7, the peripheral beveled surface 11a of the plate 11 engages the beveled surface 4b on the inside of the peripheral shoulder 4a of the plate 4. The dimension of the various parts is such that the surfaces 4a and 11a are tightly engaged while the central portion of plate 11 is stressed upwardly as shown in FIG. 8, the plate 11 then assuming an inverted dish-shaped configuration. With this arrangement, the parts are accurately aligned and are tightly held together.

Figure 9:
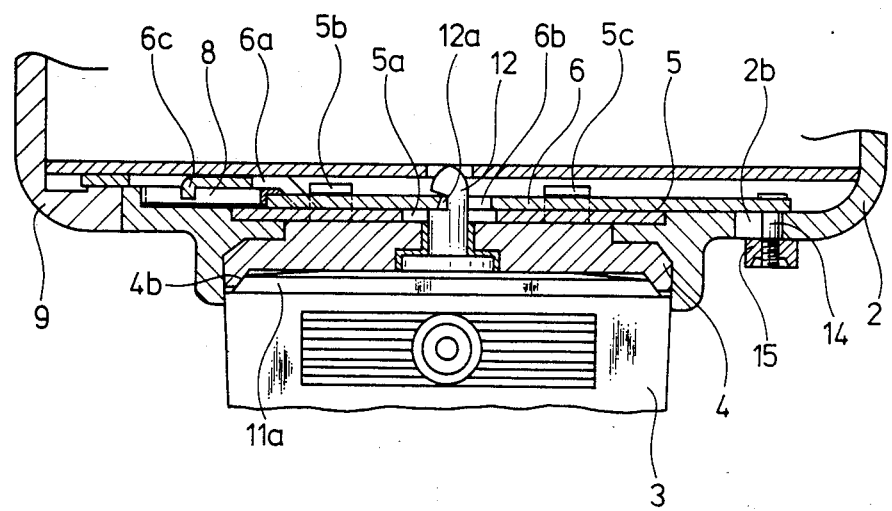
FIG. 9 is a view similar to FIG. 8 but showing a modified arrangement.

FIG. 9 shows a modified arrangement in which the slide plate is locked by means different from the means shown in FIGS. 2–8. In the embodiment shown in FIG. 9, the slide plate 6 is connected through a connecting pin 14 with an actuating member 15 on the outside of an end wall portion of the main body 2. The pin 14 projects through a slot 2b in the wall portion of the main body 2. Slot 2b extends in a direction parallel to the direction of sliding movement of the plate 6 so that the slide plate 6 may be moved between its locked and unlocked positions through movement of the actuating member 15. The actuating member 15 is preferably in the form of a nut threaded on the end of the pin 14, as shown, so that it may be loosened during movement of the slide plate and then tightened to securely hold the slide plate in a locked position.

Figure 10:
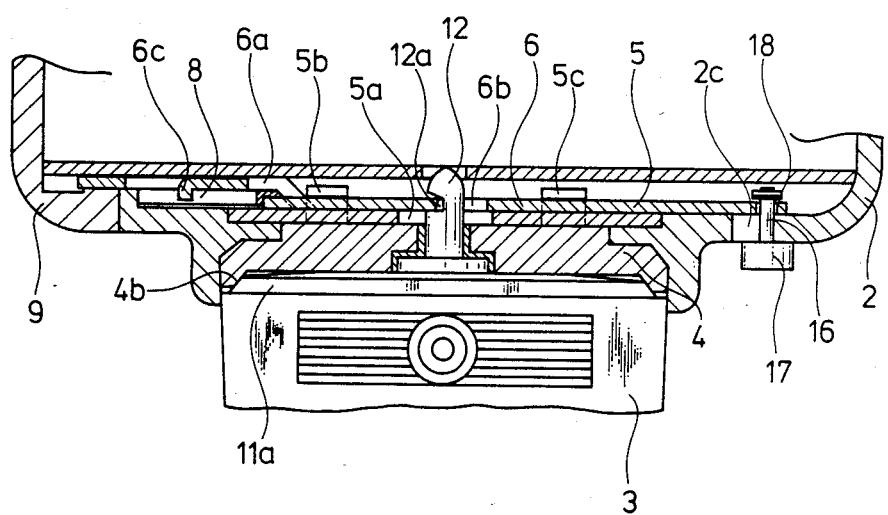
FIG. 10 is another view similar to FIG. 8 but showing another modified arrangement.
Figure 11:
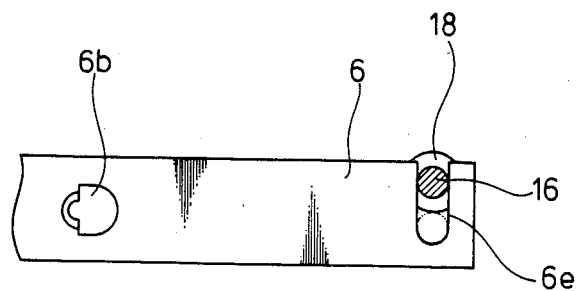
FIG. 11 is a bottom plan view showing the construction of a slide plate for the embodiment of FIG. 10.

FIG. 10 illustrates another embodiment in which the slide plate 6 is connected through a pin 16 with an actuating member 17 on the outside of an end wall portion of the main body 2. The pin 16 extends through an opening 2c in the end wall portion of the body 2, the opening 2c including a first portion which is generally parallel to the direction of movement of the slide plate 6 and a second portion which is transverse to the first portion. The pin 16 extends through a slot 6e in the plate 6 which is transverse to the direction of movement thereof, a washer 18 being riveted or otherwise secured on the end of the pin 16.

Figure 12:
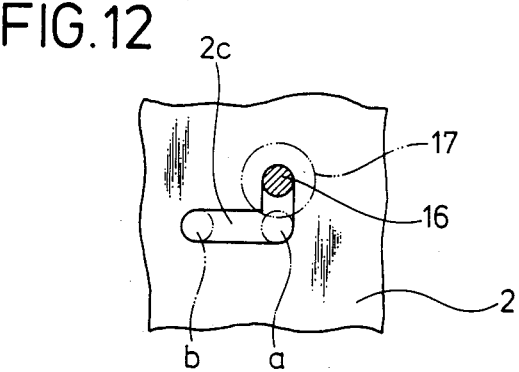
FIG. 12 is a view showing the shape of an opening in a body wall in the modification of FIG. 10.

In operation, the pin 16 may be moved through the aforementioned first portion of the opening 2c in moving between the locked and unlocked positions of the slide plate 6. When the slide plate 6 has been moved to its locked position, as depicted in FIG. 10, the pin 16 may be moved in the aforementioned second transverse portion of the opening 2c, to a position as depicted in FIG. 12, thereby securely locking the slide plate 6 in position.

Figure 13:
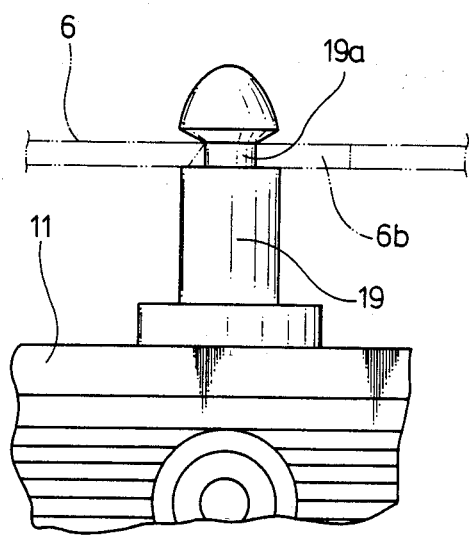
FIG. 13 is a view showing a modified form of coupling pin, on an enlarged scale.

FIG. 13 shows a coupling pin 19 of modified form which may be used in place of the coupling pin 12. The coupling pin 19 has an annular groove 19a which extends all the way around the pin at adjacent terminal ends thereof. The surface of the groove which is closest to the terminal end of the pin 19 is preferably inclined, i.e., of frusto-conical form, for camming engagement with the slide plate 6 adjacent the opening 6b therein.

It will be understood that modifications and variations may be effected without departing from the spirit and scope of the novel concepts of this invention.

I claim:

1. Photoflash apparatus, comprising: a flash unit including a main body, an adapter unit for mounting between said main body of said flash unit and a camera, and coupling means for securing said adapter unit to one end of said main body, said coupling means comprising interengageable mounting structures at said one end of said body and on said adapter unit, one of said interengageable mounting structures including a central projecting pin and the other of said mounting structures including a wall having a central opening through which said pin extends when said mounting structures are engaged, and a locking member operable to a locked position to engage said pin and lock said members together with said mounting structures being stressed in a manner such that said flash unit and said adapter unit are held tightly together and to hold said locking member in said locked position.

2. In apparatus as defined in claim 1, said one of said mounting structures being on said adapter unit and said other of said mounting structures being on said one end of said main body of said flash unit.

3. In apparatus as defined in claim 2, said main body of said flash unit including a battery compartment adjacent said one end thereof, and a door for closing said battery compartment, said door having a portion engageable with said locking member for moving said locking member to said locked position thereof when said door is fully closed.

4. In apparatus as defined in claim 1, one of said units including a body having an opening in an end wall portion thereof adjacent said other of said mounting structures, an actuating member for said locking member located on the outside of said body of said one of said units adjacent said opening, and connecting means extending from said actuating member and through said opening to said locking member for connecting said actuating member and said locking member.

5. In apparatus as defined in claim 4, said locking member being in the form of a rectilinearly movable slide plate, said opening in said wall of said body of said one of said units including a first portion extending generally parallel to the direction of movement of said slide plate and a second portion extending transversely from one end of said first portion, said connecting means between said actuating means and said slide plate being movable relative to said slide plate in a direction transverse to the direction of movement of said slide plate and being disposable in said second portion of said opening when said slide plate is moved to said locked position.

6. In apparatus as defined in claim 4, said connecting means being rigidly connected to said locking member.

7. In apparatus as defined in claim 6, said actuating member being in the form of a nut threaded on said connecting means and arranged for rotation into and out of tight frictional engagement with said wall.

8. In apparatus as defined in claim 1, said locking member being in the form of a slide plate mounted for slidable movement along the inside of said wall of said other of said mounting structures and having an opening through which a terminal end portion of said projecting pin extends when said mounting structures are interengaged, said terminal end portion of said pin having a recess for receiving a portion of said slide plate adjacent said opening therein when said slide plate is moved to said locked position.

9. In apparatus as defined in claim 8, said opening in said slide plate having a major portion with a diameter slightly larger than that of said terminal end portion of said projecting pin and having a side portion of smaller diameter for cooperation with said recess of said pin.

10. In apparatus as defined in claim 8, said recess in said pin being in the form of an annular groove.

11. In apparatus as defined in claim 8, said portion of said slide plate and a surface of said pin engaged therewith being cammingly engaged during movement of said slide plate to said locked position to augment said stressing of said structures and to resiliently hold said flash unit and said adapter unit tightly together.

12. In apparatus as defined in claim 11, said pin having a surface portion defining one side of said recess therein and inclined for camming engagement with said portion of said slide plate.

13. In apparatus as defined in claim 11, said one of said interengageable mounting structures comprising a resilient plate having peripheral portions affixed to the associated one of said units and having a central portion affixed to said pin, said resilient plate being flexed during movement of said slide plate to said locked position.

14. In apparatus as defined in claim 13, said resilient plate having a beveled peripheral surface, and said other of said mounting structures including an inwardly directed beveled surface tightly engaged with said beveled peripheral surface of said resilient plate in said locked position of said slide plate.

* * * * *